(12) United States Patent
Querejeta Andueza (10) Patent No.: US 11,054,051 B2
(45) Date of Patent: Jul. 6, 2021

(54) GAS SHUT-OFF VALVE FOR A GAS COOKING APPLIANCE AND GAS COOKING APPLIANCE INCORPORATING SAID GAS SHUT-OFF VALVE

(71) Applicant: COPRECI, S.COOP, Aretxabaleta (ES)

(72) Inventor: Félix Querejeta Andueza, Hendaye (FR)

(73) Assignee: COPRECI, S.COOP., Aretxabaleta (ES)

( * ) Notice: Subject to any disclaimer, the term of this patent is extended or adjusted under 35 U.S.C. 154(b) by 0 days.

(21) Appl. No.: 16/837,243

(22) Filed: Apr. 1, 2020

(65) Prior Publication Data
US 2020/0326009 A1 Oct. 15, 2020

(30) Foreign Application Priority Data
Apr. 9, 2019 (EP) .................................... 19382264

(51) Int. Cl.
| F16K 31/00 | (2006.01) |
| F16K 31/44 | (2006.01) |
| F16K 31/06 | (2006.01) |
| F24C 3/12 | (2006.01) |

(52) U.S. Cl.
CPC ........ *F16K 31/002* (2013.01); *F16K 31/0655* (2013.01); *F16K 31/44* (2013.01); *F24C 3/122* (2013.01)

(58) Field of Classification Search
CPC .... F16K 31/002; F16K 31/44; F16K 31/0655; F24C 3/122
See application file for complete search history.

(56) References Cited

U.S. PATENT DOCUMENTS

| 2,466,515 A * | 4/1949 | Van Denberg .......... F23N 5/105 431/55 |
| 2,658,515 A | 11/1953 | Jackson |
| 3,243,557 A | 3/1966 | Fairbanks |
| 2016/0169399 A1* | 6/2016 | Querejeta Andueza ..................... F16K 31/084 137/78.4 |

FOREIGN PATENT DOCUMENTS

WO 2014191349 A1 12/2014

\* cited by examiner

*Primary Examiner* — Eric Keasel
(74) *Attorney, Agent, or Firm* — Edell, Shapiro & Finnan, LLC (57) ABSTRACT

According to one embodiment a gas shut-off valve is provided with an intermediate port communicating a gas inlet an a gas outlet, a closing member moveable between a closed position and an open position, the intermediate port being blocked when the closing member is in the closed position. The shut-off valve includes a magnetic actuator having at least one permanent magnet and a movable element, attached to the closing member, with a ferromagnetic element adhered to the permanent magnet when the closing member is in an open position. A manual actuator of the shut-off valve is configured to move the closing member to the open position. A temperature sensing device is included that has a rod that expands and shrinks with temperature changes, with one end of the rod facing the movable element. The expansion of the rod at a closing temperature causing a pushing on the ferromagnetic element, moving the closing member from the open position to the closed position.

17 Claims, 8 Drawing Sheets

GAS SHUT-OFF VALVE FOR A GAS COOKING APPLIANCE AND GAS COOKING APPLIANCE INCORPORATING SAID GAS SHUT-OFF VALVE

CROSS-REFERENCE TO RELATED APPLICATIONS

This application relates to and claims the priority and benefit to European Application No. EP19382264.0, filed Apr. 9, 2019.

TECHNICAL FIELD

The present invention relates to gas shut-off valves for a gas cooking appliance, and to gas cooking appliances incorporating said gas shut-off valves.

BACKGROUND

Gas shut-off valves for cooking appliances impeding the passage of gas towards the burner when given circumstances arise, for example, when the flame in the burner goes out or when excessive temperatures are reached, are known.

EP2808607A1 describes a gas shut-off valve comprising a valve body comprising a gas inlet, a gas outlet, and an intermediate port for communicating the outlet with the inlet, a closing member which, in a closed position, blocks the intermediate port, impeding the passage of gas towards the outlet, and which, in an open position, does not impede said passage, and a magnetic actuator comprising a stationary permanent magnet and a movable element which is attached to the closing member, the closing member being moved integrally with the movable element, the movable element comprising a ferromagnetic element which adheres to the permanent magnet when the closing member is in the open position.

The gas shut-off valve is a flip-flop valve, the movable element comprising a coil wound on a movable bobbin, the closing member moving to the open position and to the closed position when the coil receives current pulses in opposite directions. The gas shut-off valve can thereby be controlled by means of a control unit which can, for example, monitor the temperature in the cooking appliance by means of a temperature sensing device, closing the gas shut-off valve in the event of excessive heating. The gas shut-off valve also comprises a manual actuator accessible from the outside which acts on the closing member when operated, moving it to the open position.

SUMMARY

Disclosed is a gas shut-off valve for a gas cooking appliance, and a gas cooking appliance incorporating said gas shut-off valve.

A first aspect of the invention relates to a gas shut-off valve for a gas cooking appliance, which comprises a valve body comprising a gas inlet, a gas outlet, and an intermediate port for communicating the outlet with the inlet, a closing member which, in a closed position, blocks the intermediate port, impeding the passage of gas towards the outlet, and which, in an open position, does not impede said passage, and a magnetic actuator comprising at least one stationary permanent magnet and a movable element which is attached to the closing member, the closing member being moved integrally with the movable element, the movable element comprising a ferromagnetic element which adheres to the permanent magnet when the closing member is in the open position, and the gas shut-off valve also comprising a manual actuator accessible from the outside and configured for moving the closing member to the open position, the manual actuator comprising an end pushing the closing member towards the open position when actuated.

The gas shut-off valve of the invention also comprises a temperature sensing device fixed on the outside of the valve body, the temperature sensing device comprising a rod that expands and shrinks with temperature changes, the rod comprising an end extending inside the valve body, the end of the rod being arranged facing the movable element of the magnetic actuator, the expansion of the rod at a specific closing temperature, when the closing member is in the open position, causing a pushing on the movable element, moving the ferromagnetic element out of the field of action of the permanent magnet, and moving the closing member to the closed position.

The gas shut-off valve integrates a temperature sensing device arranged outside the body of said valve, allowing the passage of gas in normal operation. When the rod of the device is heated at a predefined temperature, said rod is calibrated to push the movable element of the magnetic actuator and to cause the gas flow towards the gas outlet of the valve to be cut off. Therefore, gas shut-off takes place when a specific temperature is reached in the cooking appliance without the need for sensors and gas flow shut-off elements of another type requiring electricity to operate and without the need for a control unit acting on the gas shut-off valve. A safe, cost-effective, and reliable solution that does not require the use of electricity is therefore achieved.

A second aspect of the invention relates to a gas cooking appliance comprising at least one gas burner and one cavity below the burner where grease is accumulated, the gas cooking appliance comprising a gas shut-off valve like the one described above, the temperature sensing device of the gas shut-off valve being arranged in said cavity.

These gas cooking appliances collect grease from cooked foods at the bottom of the cavity below the burner, for example in a grease trap, and the walls of the cavity are also impregnated with grease. Sometimes the collected grease catches fire because the burners are lit, and this fire is further stoked by the convection air used for the normal operation of the burners of the cooking appliance. With the temperature sensing device being arranged in the cavity, it is heated at the temperature reached in said cavity and due to the flame of the grease, which is greater than the temperature reached in the cooking cavity when only the burners are lit. The gas shut-off valve thereby closes off the passage of gas towards the burners, which go out, so it is easier for the flame of the accumulated grease to go out.

These and other advantages and features of the invention will become apparent in view of the figures and the detailed description of the invention.

DETAILED DESCRIPTION

A first aspect of the invention relates to a gas shut-off valve 100 for a gas cooking appliance. FIGS. 1A to 8 show an embodiment of the shut-off valve 100 of the invention which comprises a valve body 10 comprising a gas inlet 11, a gas outlet 12, and an intermediate port 13 for communicating the outlet 12 with the inlet 11, a closing member 20 which, in a closed position, blocks the intermediate port 13, impeding the passage of gas towards the outlet 12, and which, in an open position, does not impede said passage, and a magnetic actuator 40 comprising two stationary permanent magnets 41, 42 and a movable element which is attached to the closing member 20, the closing member 20 being moved integrally with the movable element, the movable element comprising a ferromagnetic element 43 which adheres to the permanent magnets 41, 42 when the closing member 20 is in the open position. The gas shut-off valve 100 comprises a manual actuator 30, accessible from the outside by a user of the shut-off valve 100, and being configured for moving the closing member 20 to the open position, the manual actuator 30 comprising an end 31 pushing the closing member 20 towards the open position when actuated.

Figure 1A:
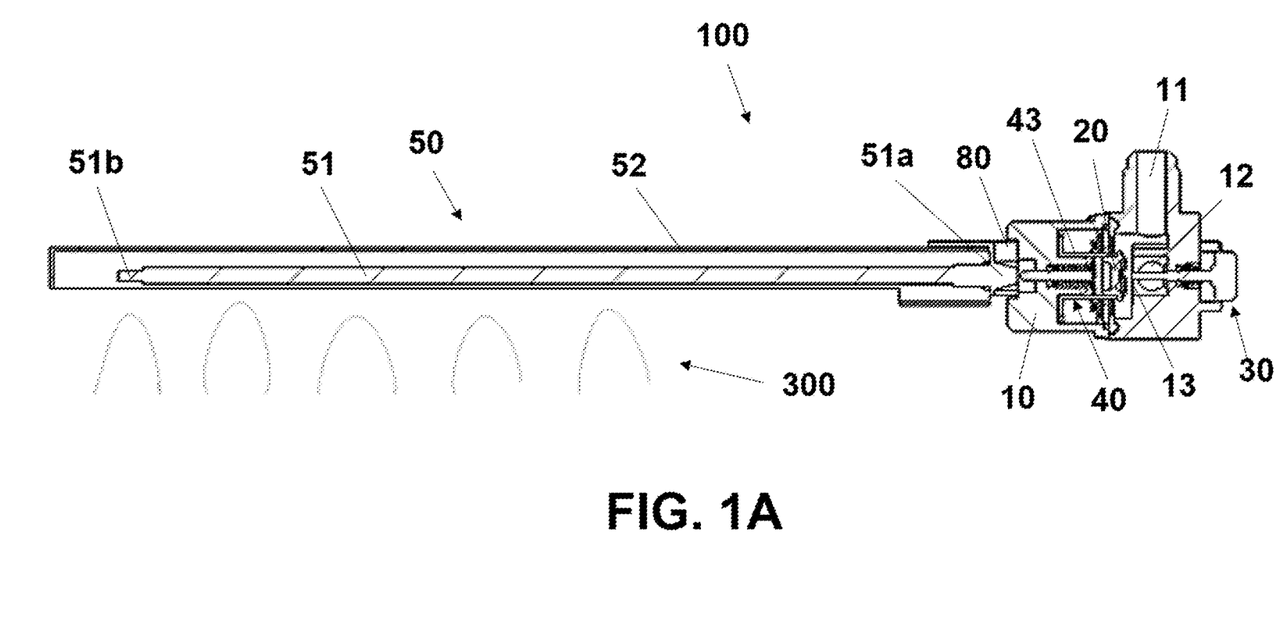
FIG. 1A shows a section view of the gas shut-off valve for a gas cooking appliance according to one embodiment.
Figure 1B:
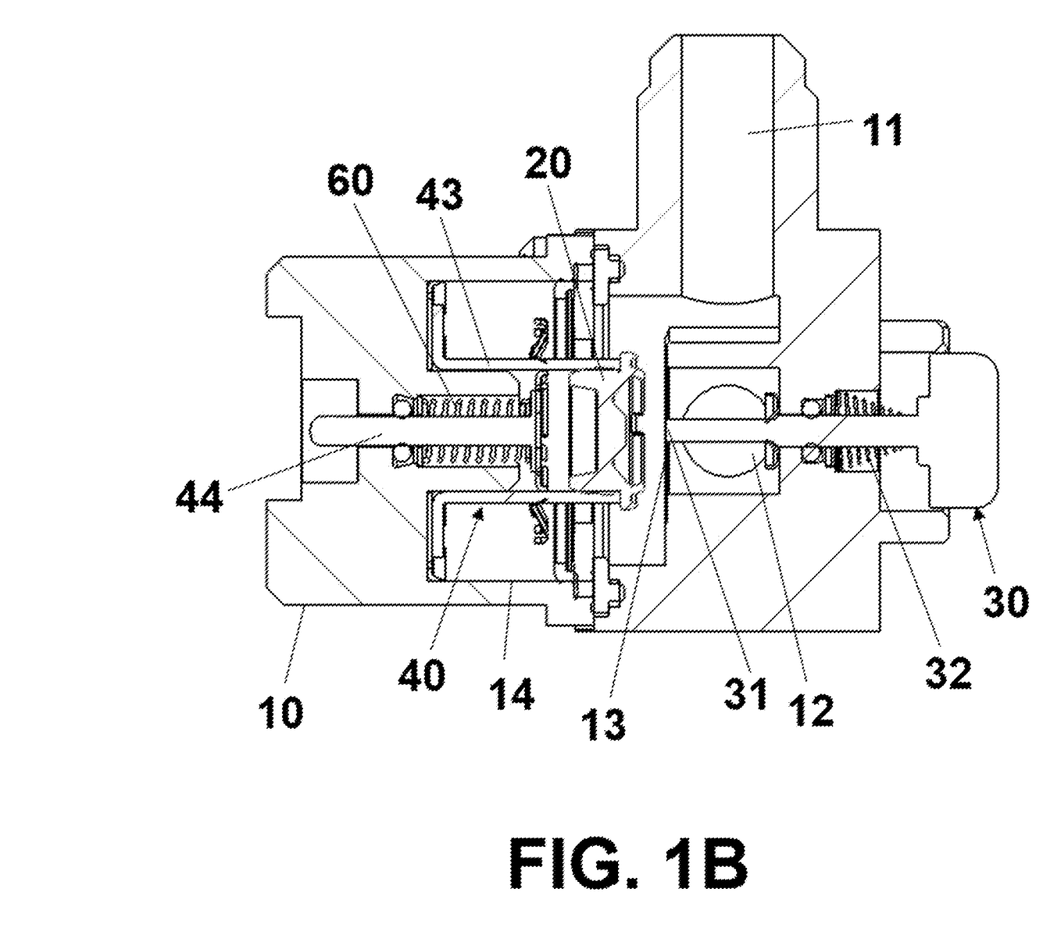
FIG. 1B shows an enlarged view of the valve body and the components therein of the gas shut-off valve of FIG. 1A.

The shut-off valve 100 also comprises a temperature sensing device 50 which is fixed on the outside of the valve body 10, the temperature sensing device 50 comprising a rod 51 that expands and shrinks with temperature changes. The rod 51 has an end 51a extending inside the valve body 10, the end 51a of the rod 50 being arranged facing the movable element of the magnetic actuator 40, the expansion of the rod 51 at a specific closing temperature, when the closing member 20 is in the open position, causing a pushing on the movable element, moving the ferromagnetic element 43 out of the field of action of the permanent magnets 41, 42, and moving the closing member 20 to the closed position.

Therefore, when the rod 51 of the device 50 is heated by means of an external heat source 300 at a predefined temperature of 300° C., for example, said rod is calibrated at a temperature and, in a position of the end 51a inside the body of the valve 10 facing the movable element of the magnetic actuator 40, pushes said movable element, moving the closing member 20 to its closed position, causing the gas flow towards the gas outlet 12 of the valve 100 to be cut off. Gas shut-off thereby takes place when a specific closing temperature is reached, without the need for temperature sensors and gas flow shut-off elements of another type requiring electricity to operate, such as thermocouples and electromagnetic shut-off valves, and without the need for a control unit acting on the gas shut-off valve. A safe, cost-effective, and reliable solution that does not require the use of electricity is therefore achieved.

In this embodiment, the temperature sensing device 50 comprises a metal guard 52, which may be made of ceramic in other embodiments, surrounding the perimeter of the rod 51 along its entire length except in the region facing the external heat source 300. In this embodiment of the shut-off valve 100, the rod 51 is made of AISI 321 steel with a coefficient of expansion of 19.28 micro per ° C. and meter of length. Therefore, in a rod 51 measuring 242 millimeters, with a 350° C. increase, said rod 51 would expand 1 millimeter. The device 50 is attached to the outside of the valve body 10 by means of threading through the guard 52, a second end 51b of the rod 51 being free of fixing elements and allowing the end 51a to freely expand or shrink with temperature changes. The valve 100 comprises insulating means 80 arranged between the guard 52 and the attachment thereof with the valve body 10, impeding the direct passage of heat towards the valve body 10, avoiding operating problems.

Figure 2:
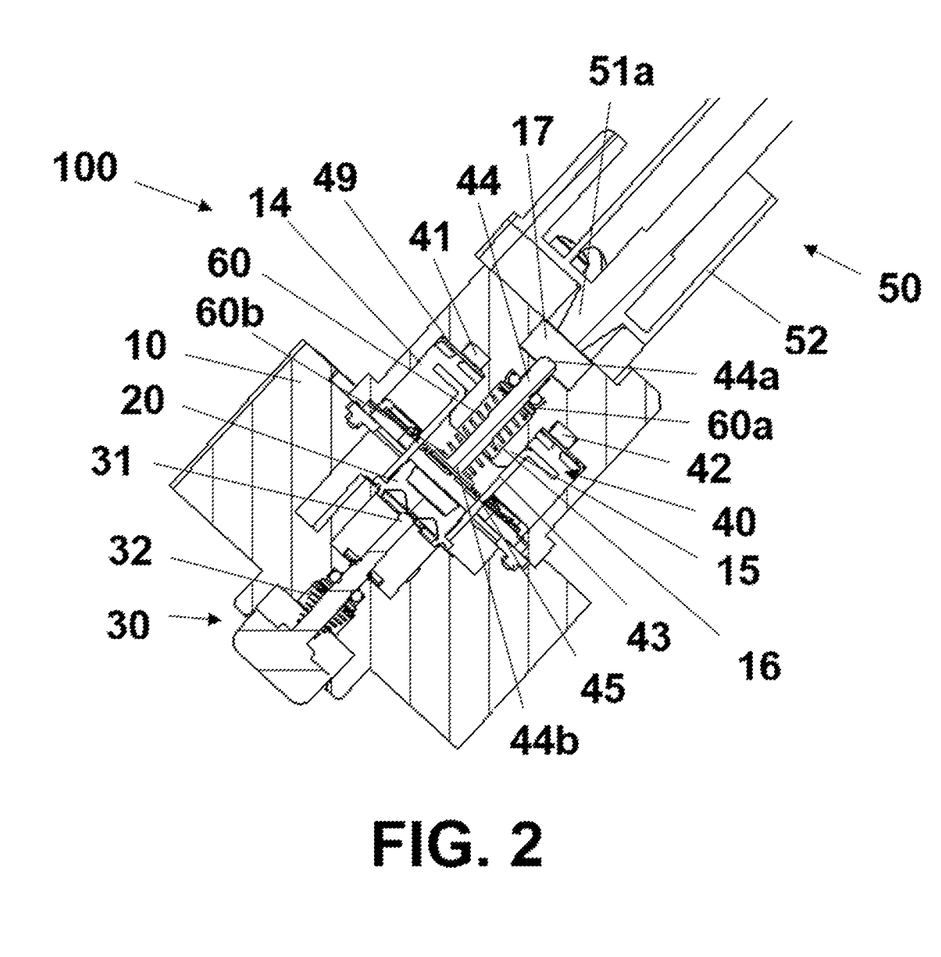
FIG. 2 shows a partial section view of the valve of FIG. 1A, with the manual actuator in standby, the rod of the sensing device at room temperature, and the closing member in the closed position.
Figure 3:
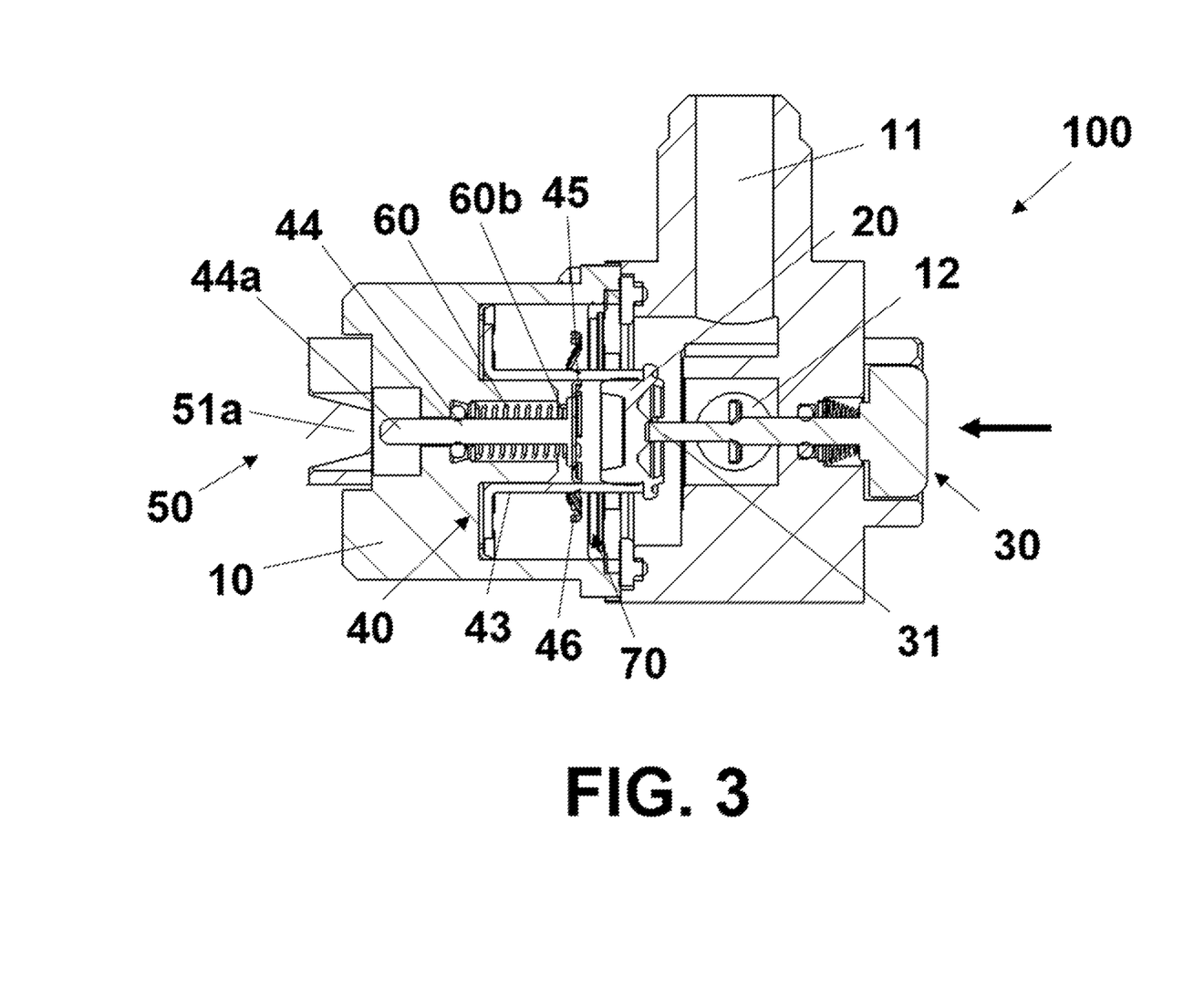
FIG. 3 shows a partial section view of the valve of FIG. 1A, with the manual actuator actuated, the rod at room temperature, and the closing member in the open position.
Figure 4:
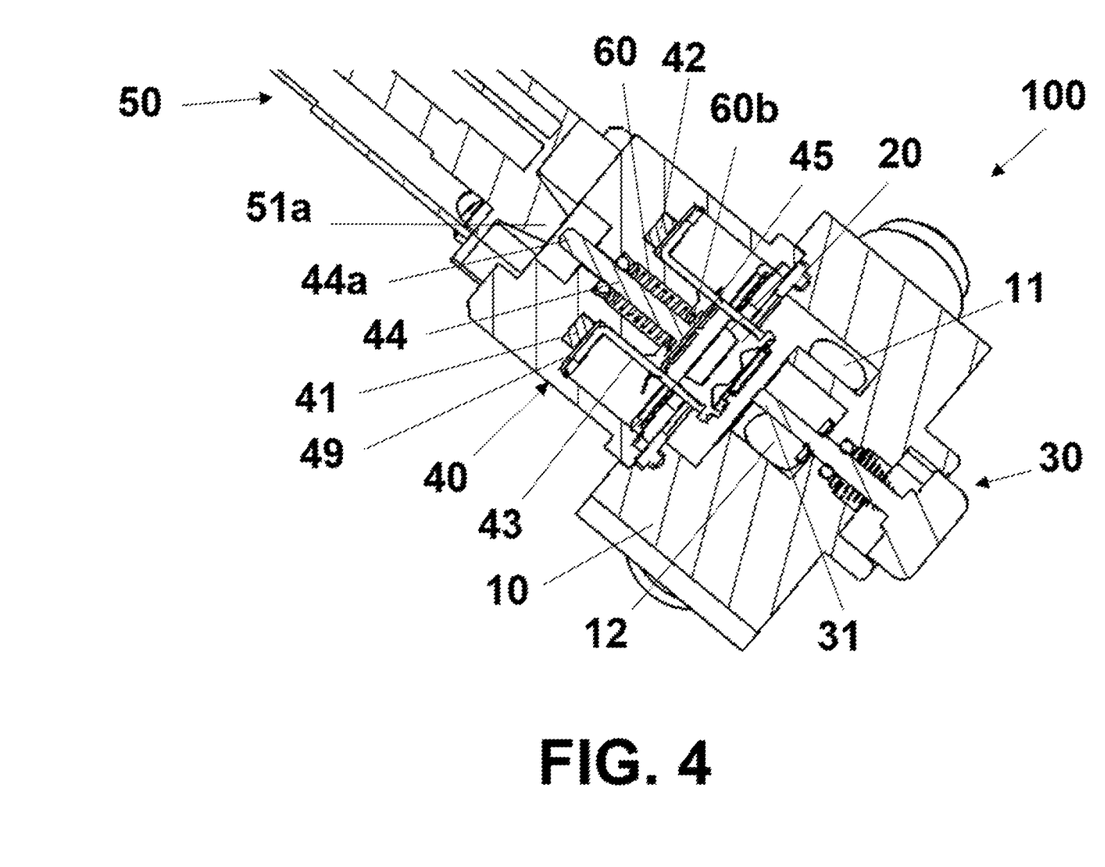
FIG. 4 shows a partial section view of the valve of FIG. 1A, with the manual actuator in standby after being actuated, the rod at room temperature, and the closing member in the open position.

The shut-off valve 100 can be manually actuated by the user, the manual actuator 30 comprising a shaft with an end 31 that projects from a lever, said end 31 pushing the closing member 20 towards the open position when the lever of the manual actuator 30 is actuated. This open position of the closing member 20 is stable since the movable element of the magnetic actuator 40 is moved with the closing member 20, and the ferromagnetic element 43 is moved with the movable element. Due to the magnetic field M generated by the permanent magnets 41, 42, the ferromagnetic element adheres to said permanent magnets 41, 42 and stays that way until reaching the defined closing temperature. Preferably, the manual actuator 30 also comprises a spring 32 associated with same for causing the manual actuator 30 to recover its initial position once it is no longer actuated. This allows the rod 50 to freely expand and to act on the ferromagnetic element 43, and it allows the closing member 20 to move to its closed position. FIGS. 2, 3, and 4 show a partial section view of the valve 100 of FIG. 1A, with the manual actuator 30 in the standby-actuated-standby positions, respectively, the rod 51 of the sensing device 50 at room temperature, about 20° C., and the closing member 20 in the closed-open position, respectively, in FIG. 2 and in FIGS. 3 and 4.

In this embodiment, the shut-off valve 100 has a valve body 10 with substantially cylindrical shape. In the interior, the valve body 10 comprises, oriented towards the temperature sensing device 50, an also cylindrical cavity 14, the valve body 10 in the cavity 14 comprising a protrusion 15 which projects into same towards the manual actuator 30 in the shaft of the valve body 10. The protrusion 15 of the valve body 10 is cylindrical and comprises an also cylindrical housing 16 in the interior thereof longitudinally running along same and open at its ends. A spring 60 is housed partially in the interior of the housing 16. The end of the housing 16 open towards the device 50 tapers, forming a flange in the interior of the housing 16. The spring 60 is a compression spring and comprises two ends 60a and 60b, the end 60a being supported on a washer which is in turn supported on the flange of the housing 16, and the second end 60b being supported on the movable element, in a position which is out of the protrusion 15 of the valve body 10. The spring 60 is compressed against the flange of the housing 16 and decompressed towards the manual actuator 30 when the closing member 20 moves to the open position and to the closed position, respectively.

Figure 6:
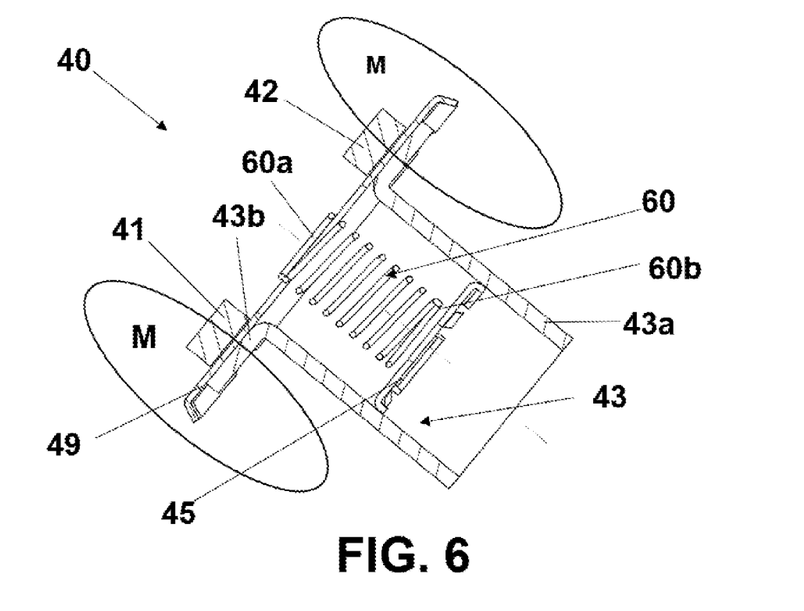
FIG. 6 shows a section view of the electromagnetic actuator and the spring of the valve of FIG. 1A, wherein the ferromagnetic element of the movable element is adhered to the permanent magnets of the magnetic actuator due to the attraction of the magnetic field of the permanent magnets.

In this embodiment, the ferromagnetic element 43 of the movable element of the magnetic actuator 40 comprises, as shown in FIG. 6 in a section view of the magnetic actuator 40 and the spring 60 of the valve 100 of FIG. 1A, wherein the ferromagnetic element 43 of the movable element is adhered to the permanent magnets 41 and 42, a cylindrical body 43a open at its ends and a circular annular fin 43b fixed at one end of the body 43a. The ferromagnetic element 43 is housed in the cavity 14 of the valve body 10, the body 43a being partially arranged slidingly surrounding the protrusion 15 of said valve body 10, the body 43a comprising an end opposite the end where the fin 43b is arranged, attached to the closing member 20.

The permanent magnets 41, 42 are housed in a stationary manner in housings of the cavity 14 of the valve body 10, around the projection base of the protrusion 15. In this embodiment of the shut-off valve 100, the magnetic actuator 40 also comprises a non-magnetic divider 49 made of aluminum, for example, which is arranged fixed in the valve body 10. As shown in FIGS. 2 and 6, the divider 49 is plate-shaped with a circular port in its center which allows the passage of the protrusion 15. Once the permanent magnets 41, 42 are arranged in their housings, the divider 49 is fixed in the cavity 14 against the wall comprising the housings of the permanent magnets 41, 42, fixing said permanent magnets 41, 42 in a stationary manner, the divider 49 therefore being arranged between the permanent magnets 41, 42 and the ferromagnetic element 43. The divider 49 thereby also impedes the dragging of the permanent magnets 41, 42 when the closing member 20 is moved to the closed position, dragging the ferromagnetic element 43.

The movable element of the magnetic actuator also comprises a shaft 44 and a support 45 fixed to the ferromagnetic element 43. The support 45 is a disk-shaped part which is arranged fixed in the interior of the body 43a of the ferromagnetic element 43 at a specific height of said body 43a, and facing the end of the protrusion 15. The second end 60b of the spring 60 is arranged supported on the support 45. The shaft 44 of the movable element is arranged attached to the support 45 at a second end 44b and is prolonged along the housing 16 of the protrusion 15, partially surrounded by the spring 60. The shaft 44 comprises an end 44a, opposite the second end 44b, protruding from the end 60a of the spring 60 and prolonged by the tapering at the open end of the protrusion 15 into a cavity 17 of the valve body 10 arranged on the cavity 14. The end 51a of the rod 51 of the device 50 projects towards the cavity 17, with the end 44a of the shaft 44 facing the end 51a of the rod 51. To avoid gas leaks from the cavity 14 of the valve body 10 through the housing 16 of the protrusion 15, the shut-off valve 100 comprises a sealing gasket arranged supported on the support flange of the housing 16 for the spring 60 and surrounding the shaft 44 of the movable element, such that the end 60a of the spring 60 is supported on the washer, which is in turn supported on the sealing gasket.

Depending on where the support 45 of the movable element is positioned on the ferromagnetic element 43, since the second end 60b of the spring 60 is supported on the support 45, the force exerted by said support 60 on the ferromagnetic element 43, which is sliding, will be more or less. Therefore, when the closing member 20 is in the open position and the ferromagnetic element 43 is adhered to the permanent magnets 41, 42, while the temperature of the external source 300 is increased, and until reaching the defined closing temperature, there comes a point when the end 51a of the rod 51 expands longitudinally and is supported on the end 44a of the shaft 44, pushing it. There is produced at that point an equilibrium position between the pushing force exerted by the rod 51 on the movable element, to which the force exerted by the spring 60 on said movable element is added, and the attractive force exerted by the magnetic field M due to the permanent magnets 41, 42 on the ferromagnetic element 43, and therefore on the movable element of the magnetic actuator 40.

To that end, and before starting the operation of the shut-off valve 100, said valve 100 is calibrated. For example, if an operating closing temperature of 300° C. is defined, the closing member 20 is positioned in the open position, and the ferromagnetic element 43 adheres to the permanent magnets 41, 42. The rod 51 is subjected to a temperature of 250° C., and the support 45 and therefore the shaft 44 are positioned in the equilibrium position defined above between the forces exerted on the movable element by the rod 51 and the spring 60 in one direction, and the force exerted by the magnetic field M in the opposite direction.

In the embodiment of the shut-off valve 100 that is shown, if the position of the end 51a of the rod 51 as the temperature to which it is subjected increases is defined as x1, and the position of the ferromagnetic element 43 of the movable element is defined as x2, at room temperature x1 is zero millimeters and x2 is zero millimeters. At about 200° C., x1 is between 0.4 and 0.5 millimeters, and the end 51a of the rod 51 contacts the end 44a of the shaft 44. After this temperature, the ferromagnetic element 43 starts to detach from the permanent magnets 41, 42, increasing the distance x2 from zero, but the forces involved are in equilibrium. Close to 300° C., when x1 is between about 0.8 and about 0.9 millimeters, the attractive force due to the magnetic field M gradually decreases, and the opposing force of the spring 60 also slightly decreases, the detachment of the ferromagnetic element being accelerated. After surpassing 300° C., with x1 being about 1 millimeter, the forces exerted by the rod 51 and the spring 60 are greater than the force of the magnetic field M, and the movable element is moved out of the influence of the magnetic field M of the permanent magnets 41 and 42, the spring 60 moving the closing member 20 to the closed position.

Figure 5:
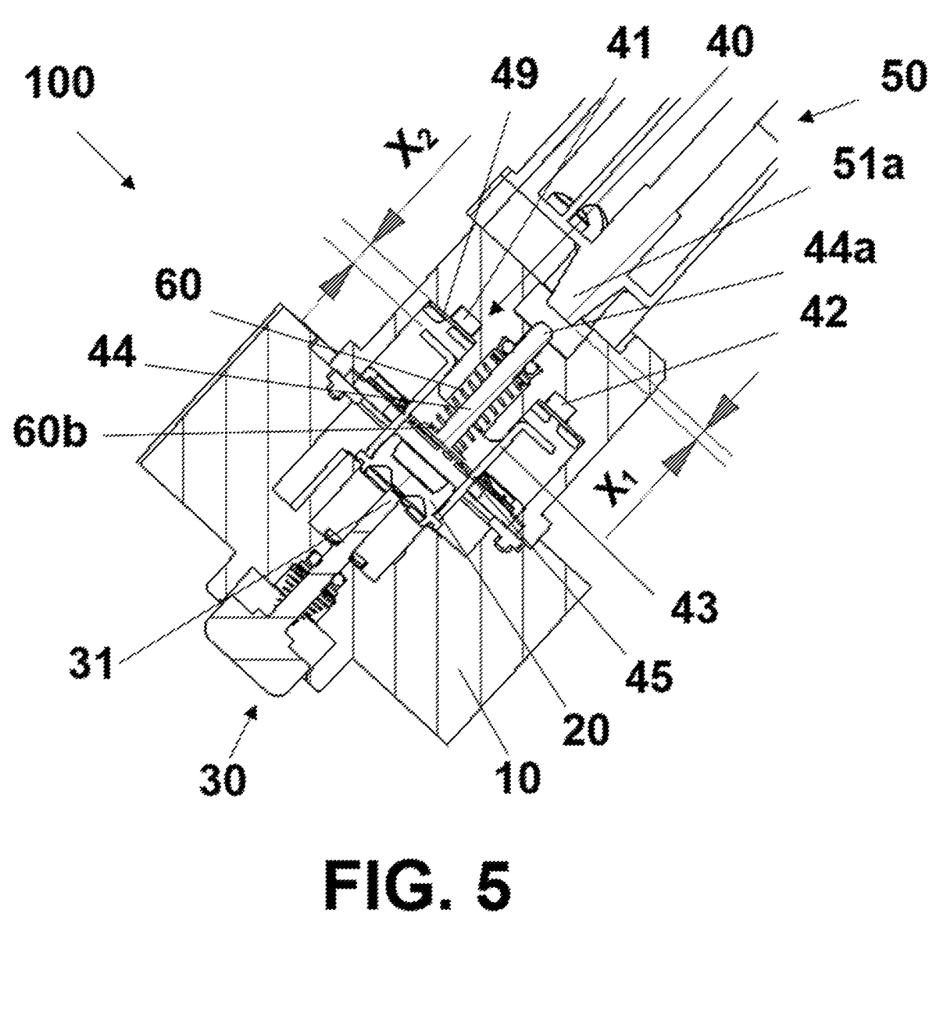
FIG. 5 shows a partial section view of the valve of FIG. 1A, with the manual actuator in standby, the rod at the closing temperature, and the closing member in the closed position.

As shown in FIG. 5, once the closing member 20 is in the closed position, and the gas shut-off valve 100 is closed, impeding the passage of gas towards the gas outlet 12, the user cannot immediately open said valve 100, since the rod 51 is still expanded due to the temperature to which it is subjected. If the user acts on the manual actuator 30, attempting to open the shut-off valve 100, the end 31 pushes the closing member 20, but when the movable element attempts to move, the end 44a of the shaft 44 is supported on the end 51a of the rod 51, which is moved, and cannot move the ferromagnetic element 43 to its adherence position with the permanent magnets 41 and 42 due to the magnetic field M, the spring 60 again moving the closing member 20 of the movable element to the closed position. The user must wait until the rod 51 cools below 250° C., at which point the position x1 of the end 51*a* of the rod 51 allows adherence and maintenance of the ferromagnetic element 43 and therefore of the closing member 20 in the open position.

Figure 7:
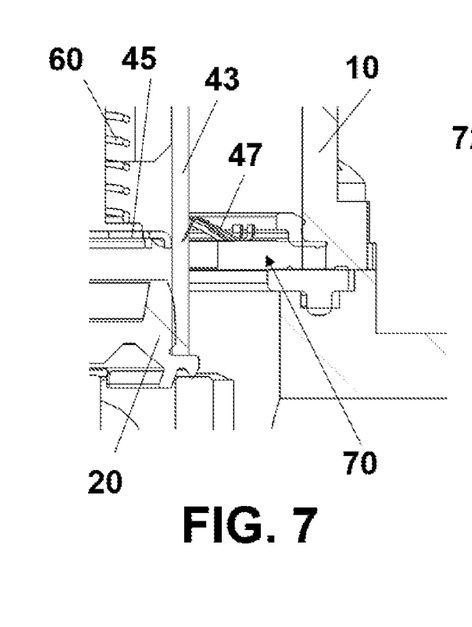
FIG. 7 shows a partial section view of the printed circuit of the valve of FIG. 1A assembled in the valve body, with the tabs of the movable element in contact with the connection means of the printed circuit.
Figure 8:
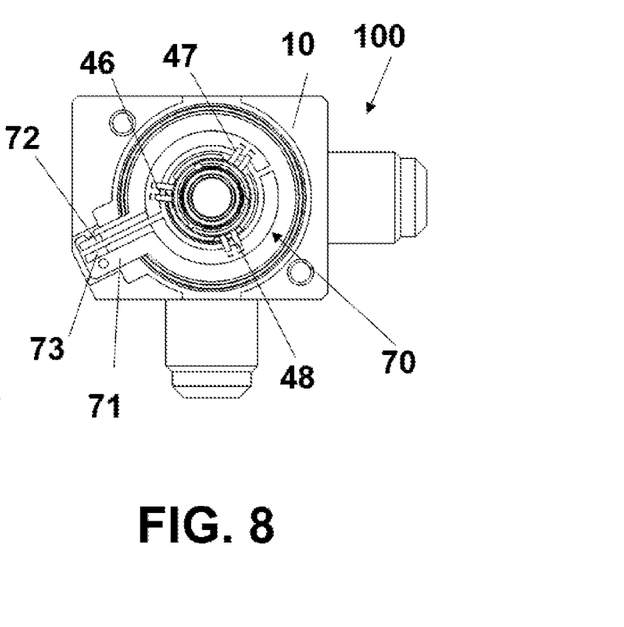
FIG. 8 shows a top plan view of the valve of FIG. 1A, with the tabs of the movable element in contact with the connection means of the printed circuit.

In this embodiment, the shut-off valve 100 also comprises a printed circuit 70, preferably made of aluminum, fixed to the valve body 10, shown in detail in FIGS. 7 and 8. In this embodiment, the printed circuit 70 is a circular annular part surrounding the ferromagnetic element 43, allowing it to move. The printed circuit 70 comprises a connection region 71, which is an extension of said printed circuit 70 and is accessible from the outside of the valve 100, being adapted for receiving a connector (not shown in the figures). The printed circuit 70 also comprises connection means 72, 73 extending in the printed circuit 70 as two connecting tracks from the connection region 71. Moreover, the ferromagnetic element 43 of the movable element comprises in this embodiment three flexible metal tabs 46, 47, 48 which can be made of brass or of ferronickel, and therefore being electrically conductive, fixed on the outside of the wall of the body 43*a* of the ferromagnetic element 43, for example being embedded in said wall, and angularly arranged with respect to one another at 120°. When the closing member 20 is moved to the closed position driven by the spring 60, the tabs 46, 47, 48 short-circuit the two tracks of the connection means 72, 73 and ground said tracks, assuring with three tabs contact with the tracks to overcome possible rocking of the ferromagnetic element 43. An electric signal can thereby be sent out through the connection region 71, allowing said signal to activate some type of alarm by means of an external control unit (not shown in the figures), such as an alarm with sound or light for example.

Since the movement of the closing member 20 to the closed position is caused by the spring 60, to ensure the cut-off of the passage of gas being suitable, the tabs 46, 47, 48 exert an opposing bending force against the printed circuit 70 that is much less than the force exerted by the spring 60.

Figure 9:
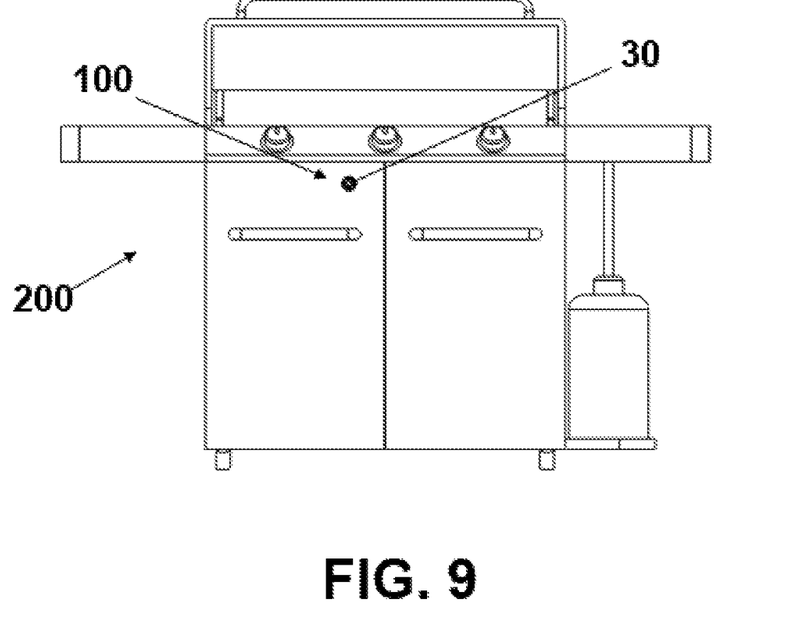
FIG. 9 shows a front view of the gas cooking appliance of the invention.
Figure 10:
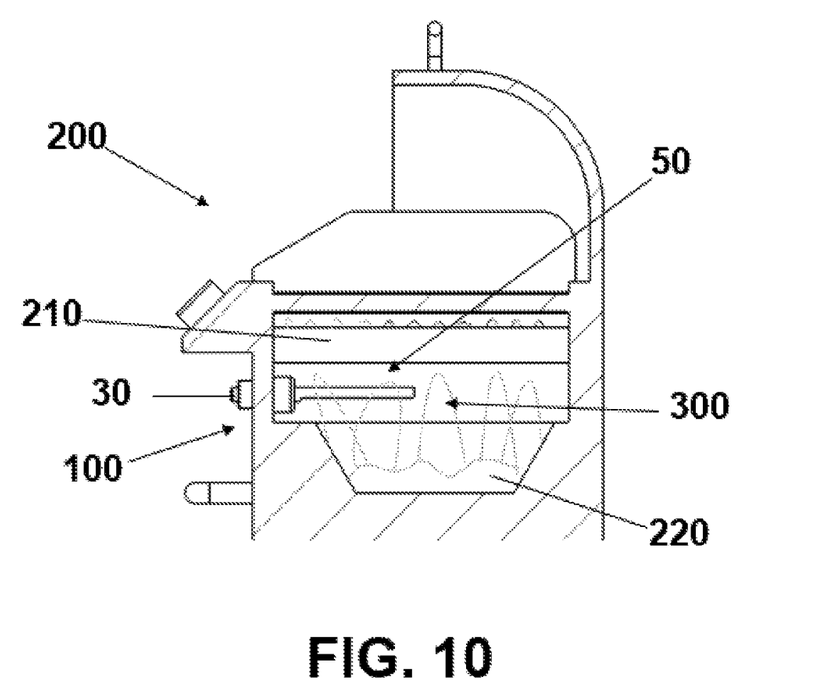
FIG. 10 shows a partial section view of the gas cooking appliance of FIG. 9, with at least one gas burner and one heat source other than that of the burner arranged in a cavity of the cooking appliance, the temperature sensing device being arranged in the cavity below the plane of the burner.

A second aspect of the invention relates to a gas cooking appliance 200 which, in the embodiment shown, is a barbecue grill. FIG. 9 shows a front view of the gas cooking appliance 200 with three knobs corresponding to three gas valves (not shown in the figures) supplying gas to three gas burners 210, and the manual actuator 30 of the shut-off valve of the invention accessible from the outside. FIG. 10 shows a partial section view of the gas cooking appliance 200 of FIG. 9, showing one of the gas burners 210 and a heat source 300 other than that of the burner 210. Below the horizontal position of the burner 210, the cooking appliance 200 comprises a cavity 220 with walls and a bottom in which, with the use of the cooking appliance 200 and over time, grease from food accumulates if cleaning is not suitable.

The cooking appliance 200 comprises a gas shut-off valve 100 with a configuration like the one described above, which is arranged assembled in the cooking appliance 200 below the horizontal position of the burner 210, such that the temperature sensing device 50 is located in the cavity 220 below the plane of said burner 210, the gas inlet 11 of the valve 100 being in fluid communication with a gas supply source, and the gas outlet 12 of the valve 100 being in fluid communication with the gas valves supplying gas to the gas burners 210. In the normal operation of the cooking appliance 200, the maximum temperature reached in the cavity 220 with all the burners 210 at maximum capacity, the lid closed, and more than an hour of operation is 250° C. Therefore, the shut-off valve 100 does not cut off the passage of gas. If there is an accumulation of grease and said grease catches fire causing an external heat source 300, the temperature will increase, and upon reaching 300° C. the shut-off valve 100 will cut off the passage of gas towards the gas burners 210. The burners 210 will go out, making it easier to put out the flame of the accumulated grease.

The following clauses disclose in an unlimited way additional embodiments.

What is claimed is:

1. A gas shut-off valve for a gas cooking appliance comprising:
    a valve body including a gas inlet, a gas outlet, and an intermediate port that communicates the gas outlet with the gas inlet;
    a closing member moveable between a closed position and an open position, when in the closed position the closing member blocks the intermediate port to prevent fluid communication between the gas inlet and gas outlet, when in the open position the closing member does not block the intermediate port to cause fluid communication between the gas inlet and gas outlet;
    a magnetic actuator including a stationary permanent magnet and a movable element to which the closing member is attached, the movable element comprising a ferromagnetic element that adheres to the permanent magnet when the closing member is in the open position to hold the closing member in the open position;
    a manual actuator that includes a hand actuator located outside of the valve body and a shaft coupled to the hand actuator that extends inside the valve body, the manual actuator configured such that when the hand actuator is pressed an end of the shaft acts on the closing member to move the closing member towards the open position; and
    a temperature sensing device extending outside the valve body, the temperature sensing device including a rod that lengthens with an increases in rod temperature and shortens with a decrease in rod temperature, the rod having an end located inside the valve body, the end arranged facing the movable element of the magnetic actuator, the rod being configured to lengthen when the rod temperature rises to a closing temperature, the lengthening of the rod being sufficient to cause the end of the rod to apply a pushing force on the moveable element to cause the closing member to transition from the open position to the closed position, moving the ferromagnetic element away from a field of action of the permanent magnet, the temperature sensing device comprising a guard partially surrounding a perimeter of the rod, the guard having an opening configured to face a heat source.

2. The gas shut-off valve according to claim 1, wherein the end of the rod is configured to assume an equilibrium position prior to rising to the closing temperature wherein a force exerted by the end of the rod on the moveable element is in equilibrium with an attractive force of the permanent magnet on the ferromagnetic element.

3. The gas shut-off valve according to claim 1, further comprising a spring having a first end and a second end, the first end being supported on a part of the valve body, the second end being supported on the movable element, the closing member being continuously urged toward the closed position by the spring.

4. The gas shut-off valve according to claim 3, wherein the movable element includes a shaft and a support, the shaft having a first end and a second end, the first end of the shaft arranged facing the end of the rod, the second end of the shaft being attached to the support, the spring at least partially surrounding the shaft, the second end of the spring being supported on the support.

5. The gas shut-off valve according to claim 4, wherein the pushing force exerted by the end of the rod when the rod reaches the closing temperature and a force exerted by the spring on the movable element of the magnetic actuator together cause the ferromagnetic element to move away from the field of action of the permanent magnet.

6. The gas shut-off valve according to claim 3, wherein the pushing force exerted by the end of the rod when the rod reaches the closing temperature and a force exerted by the spring on the movable element of the magnetic actuator together cause the ferromagnetic element to move away from the field of action of the permanent magnet.

7. The gas shut-off valve according to claim 3, wherein the ferromagnetic element comprises a cylindrical body and a perimeter fin at an end of the cylindrical body, the ferromagnetic element being housed in a cavity of the valve body, the cylindrical body being arranged surrounding a protrusion of the valve body and being configured to slide over the protrusion, the permanent magnet being housed in a stationary manner in the cavity of the valve body.

8. The gas shut-off valve according to claim 7, wherein the protrusion of the valve body includes a longitudinal housing having an open first end and an open second end, the spring being at least partially housed inside the housing with the first end of the spring supported on a flange located in the housing, the support of the movable element being arranged in an interior of the ferromagnetic element surrounding the protrusion, the first end of the shaft protruding from the housing towards the end of the rod.

9. The gas shut-off valve according to claim 8, wherein the magnetic actuator comprises a non-magnetic divider arranged fixed in the valve body between the permanent magnet and the ferromagnetic element, the non-magnetic divider configured to assist holding the permanent magnet stationary in the valve body when the ferromagnetic element is moved away from the permanent magnet.

10. The gas shut-off valve according to claim 7, wherein the magnetic actuator comprises a non-magnetic divider arranged fixed in the valve body between the permanent magnet and the ferromagnetic element, the non-magnetic divider configured to assist holding the permanent magnet stationary in the valve body when the ferromagnetic element is moved away from the permanent magnet.

11. The gas shut-off valve according to claim 1, further comprising a spring having a first end and a second end, the first end being supported on a part of the valve body, the second end being supported on the movable element, the closing member being continuously urged toward the closed position by the spring, the end of the rod being configured to assume an equilibrium position prior to rising to the closing temperature wherein a force exerted by the end of the rod and the spring on the moveable element in first direction is in equilibrium with an attractive force of the permanent magnet on the ferromagnetic element, the attractive force being in a second direction opposite the first direction.

12. The gas shut-off valve according to claim 1, further comprising a printed circuit fixed to the valve body and arranged adjacent to the ferromagnetic element of the movable element, the printed circuit including a connection region that is accessible from an outside of the valve body, and first and second electrical conductors located inside the valve body that are electrically coupled to the connection region, the movable element of the magnetic actuator comprising one or more metal tabs that are configured to contact and short-circuit the first and second electrical conductors when the closing member is moved to the closed position.

13. The gas shut-off valve according to claim 12, wherein the printed circuit is configured to generate a signal at the connection region upon the short-circuit of the first and second electrical conductors.

14. The gas shut-off valve according to claim 12, wherein when the one or more tabs contact the first and second conductors they are configured to exert a force on the moveable element that does not exceed a force exerted by the spring on the moveable element.

15. The gas shut-off valve according to claim 1, further comprising a thermal insulator arranged between the guard and an attachment thereof with the valve body, the thermal insulator configured to impede a passage of heat towards the valve body.

16. The gas shut-off valve according to claim 1, wherein the manual actuator comprises a spring that continuously urges the end of the shaft of the manual actuator away from the closing member.

17. A gas cooking appliance comprising:
    a gas burner configured to cook a food product;
    a cavity below the gas burner;
    a gas shut-off valve according to claim 1, the temperature sensing device being arranged in the cavity.

* * * * *